United States Patent [19]
Betten

[11] 3,902,051
[45] Aug. 26, 1975

[54] CONTROL SYSTEM MONITOR AND FAULT DISCRIMINATOR

[75] Inventor: Carl B. Betten, Seattle, Wash.

[73] Assignee: The Boeing Company, Seattle, Wash.

[22] Filed: June 13, 1974

[21] Appl. No.: 478,923

[52] U.S. Cl. ........... 235/150.1; 235/150.2; 318/585
[51] Int. Cl................................................ G06g 7/66
[58] Field of Search ...... 235/150.1, 150.2; 318/565, 318/580, 583, 585, 588

[56] References Cited
UNITED STATES PATENTS

| | | | |
|---|---|---|---|
| 2,983,859 | 5/1961 | Coales et al. ................ | 235/150.1 X |
| 3,463,908 | 8/1969 | Connelly.......................... | 235/150.1 |
| 3,466,430 | 9/1969 | Hardaway....................... | 235/150.1 |
| 3,657,524 | 4/1972 | Bakke.............................. | 235/150.1 |
| 3,816,715 | 6/1974 | Johnson.......................... | 235/150.1 |

*Primary Examiner*—Malcolm A. Morrison
*Assistant Examiner*—Jerry Smith
*Attorney, Agent, or Firm*—Brown, Murray, Flick & Peckham

[57] ABSTRACT

A control system monitor and fault discriminator which can continuously monitor feedback control system performance during service and discriminate between normal and faulty operation. Two control system signals comprising the error channel signal and the command input signal are continuously monitored; and functions of these two signals are selected which take advantage of their correlation to make a more precise discrimination between normal and faulty control system operation.

8 Claims, 4 Drawing Figures

3,902,051

CONTROL SYSTEM MONITOR AND FAULT DISCRIMINATOR

BACKGROUND OF THE INVENTION

While the present invention is applicable to any feedback control system whose command and error channel signals are accessible, it is particularly adapted for use in the roll control system of a hydrofoil ship. In a hydrofoil seacraft of this type, the hull of the ship is lifted out of the water by means of foils which are carried on struts and usually pass through the water beneath the surface thereof. In passing through the water, and assuming that sufficient speed is attained, the foils create enough lift to raise the hull above the surface and, hence, eliminate the normal resistance encountered by a ship hull in passing through the water.

In the usual case, there are forward and aft foils both provided with control flaps similar to those used in aircraft, although in some cases, the entire foils may be rotatable and used as control surfaces. The other essential control element is the rudder which pierces or is submerged beneath the surface of the water and may be either forward or aft of the ship, depending upon its design. In most hydrofoils, the flaps or control surfaces are used primarily to cause the ship to ascend or decend and to control the craft about its pitch and roll axes. However, they can also be used in combination with the rudder to bank the ship about its roll axis during a turn. The flaps are also used to stabilize the ship during movement over water so that pitching or rolling motions can be minimized by proper counterbalancing movement of the flaps. A control system of this general type is disclosed and claimed in copending application Ser. No. 302,559, filed Oct. 31, 1972 and assigned to the Assignee of the present application.

In any hydrofoil control system, safety is a paramount consideration, particularly in the roll control system. In the type of control mentioned above, the roll control system comprises sensing means for sensing motion of the ship about the roll axis and means responsive to the signals generated by the sensing means for effecting the desired movement of the control surfaces to counteract the rolling motion and stabilize the ship about its roll axis. In case of a failure or malfunction in this roll control system, an unsafe condition can develop in which the motion of the ship becomes unstable; and the ship can exhibit divergent motions such that it may impact the water with angular rates of motion and attitudes that can endanger personnel on board the ship and cause possible damage to the ship.

A rapid roll channel failure detection system is, therefore, needed to permit early corrective action which reduces the severity of the failure. Precision of discrimination between normal and abnormal control system operation is required to increase the speed of failure detection, reduce the number or range of undetectable failures, and reduce the probability of a false alarm.

Systems have been devised for roll control monitoring and error detection wherein only one control system signal is monitored, this being the roll error signal that drives the control surface actuators. This error signal is compared with a fixed reference value or fixed bias. The resulting comparator output indicates a fault condition whenever the absolute value of the error signal exceeds the preselected value of the bias signal. Whenever the error signal exceeds this preselected value, an alarm is activated and/or an automatic landing procedure is initiated.

The speed and accuracy of error detection in a system of the type described above is limited by the fact that the absolute magnitude of the error is compared with a single preselected value, without regard to the system operating point or command input signal. The magnitude of the bias signal must be selected at a value larger than the largest error signal that can be produced in the roll control loop during normal operation; but some failures can produce error signals of a much lower magnitude and, therefore, go by undetected. For example, assume that a hydrofoil flying at its maximum bank angle of $-16°$ is commanded to roll to its opposite limit of $+16°$. During the maneuver, the error channel signal reaches a maximum of $+15°$. This error channel response to a normal maneuver establishes a lower limit for the error detector's reference value of $15°$. If, however, the feedback transducer or roll gyro were to fail hard over to $-26°$ during a turn at $-16°$ bank angle, the resulting error would be only $+10°$ and could not be detected by the comparator referenced to a $+15°$ bias signal. Therefore, since a system of this type does not monitor the command input signal, it cannot recognize the obvious fact that a constant command input of $-16°$ in combination with a $+10°$ step in roll error signal is a clear indication of a faulty roll feedback loop.

SUMMARY OF THE INVENTION

In accordance with the present invention, a new and improved control system monitor-fault discriminator is provided wherein two control system signals comprising the error channel signal and the command input signal are continuously monitored, and functions of these two signals are selected to take advantage of their correlation to make a more precise discrimination between normal and faulty control system operation.

Specifically, there is provided, in a control system of the type in which a command signal and response sensor signal are processed to form an error signal for controlling a servo actuator, the combination of a plurality of comparator devices, and a reference signal shaping network which converts the command signal into a reference signal, together with means for applying both the reference and error signals to each of the comparator devices. The comparator devices are adapted to produce an output indicative of an off-normal condition when the trajectory of a plot of the error signal versus the reference signal exceeds a predetermined value about a zero error reference point. When an output is produced from one of the comparators, an off-normal condition is indicated and/or means are provided for taking corrective action. The aforesaid reference and error signals will both vary above and below a zero voltage point, whereby the trajectory of the error signal versus the reference signal can traverse four quadrants about the zero voltage point. Preferably, there are four comparator devices, each of which will produce an output indicating an off-normal condition when the error versus reference trajectory exceeds a predetermined value in an associated one of the quadrants.

Each of the comparator devices can comprise a high gain amplifier to which a source of bias voltage, the error signal, and the reference signal are applied. The output polarity of each comparator is a reflection of the algebraic sign of the weighted sum of the three signals applied thereto. An output is derived from any one of the high gain amplifiers when the trajectory of error versus reference signal traverses an error discrimination line in one of four quadrants of a plot of error signal versus reference signal, each discrimination line being positioned with respect to the X and Y axes of the plot so that together they completely enclose the trajectories for all permissible operating conditions.

The above and other objects and features of the invention will become apparent from the following detailed description taken in connection with the accompanying drawings which form a part of this specification, and in which.

Figure 1:
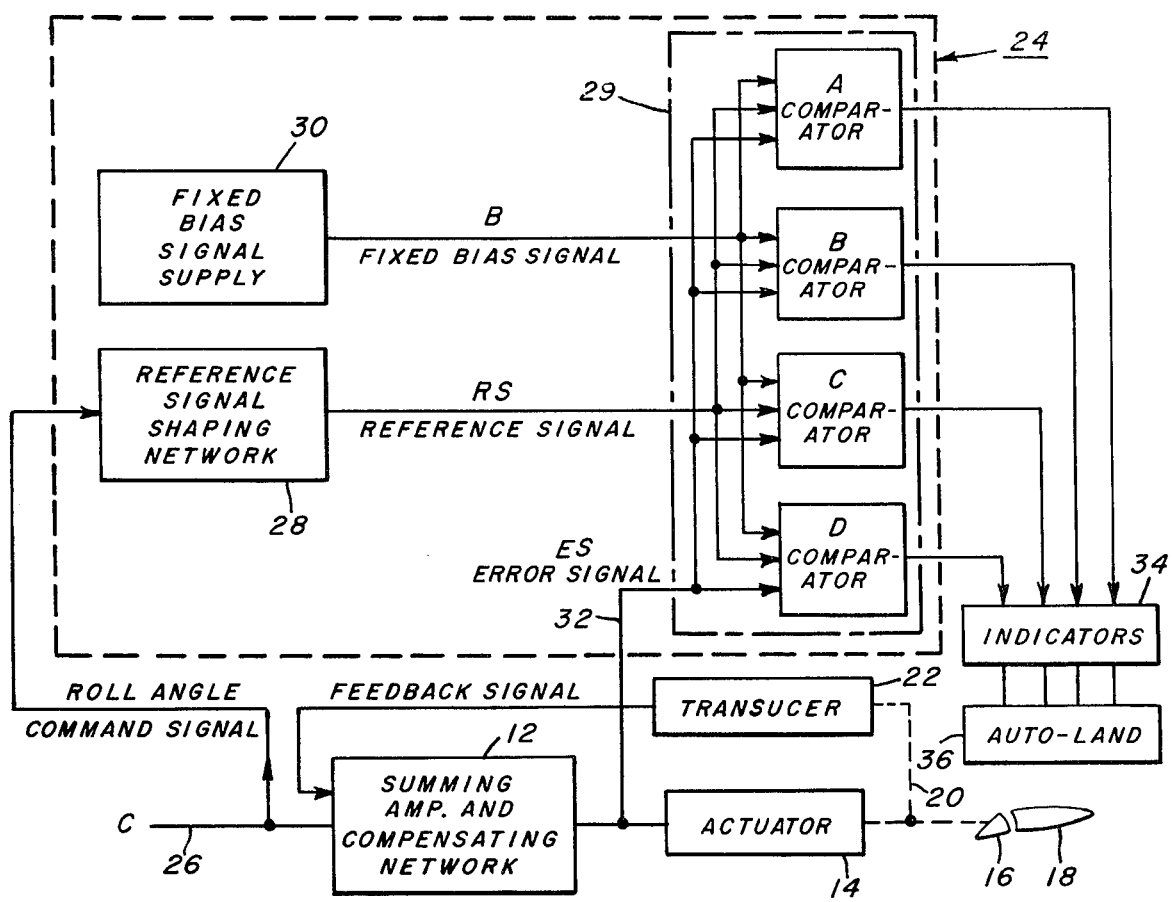
FIG. 1 is a block diagram of one embodiment of the control system monitor of the invention, together with a block diagram of a feedback control system to which it is applied.

With reference now to the drawings, and particularly to FIG. 1, the invention is shown in connection with a servo system for controlling the flaps of a hydrofoil ship; however it should be understood that the invention has application to any servo system. A roll angle command signal is applied to a summing amplifier and compensating network 12. The output of the summing amplifier, constituting an error signal for the servo system, is applied to a mechanical actuator 14 which, in turn, actuates the control surface or flap 16 on the foil 18 of a hydrofoil ship. Normally, in a roll control system for a hydrofoil ship, there are at least two control surfaces 16, one on the portside and one on the starboard side of the ship in order that any rolling motion can be compensated for. However, only a single control flap and servo system therefor are shown herein for purposes of simplicity.

The mechanical motion of the control flap 16 is converted through a mechanical linkage 20 and transducer 22 into a corresponding electrical signal which is applied as an input to the summing amplifier 12, the arrangement being such that when the output of the transducer matches the roll angle command signal, movement of the control flap by the actuator 14 will cease, all in accordance with usual servo system practice.

The control system monitor of the invention is enclosed by broken lines in FIG. 1 and identified by the reference numeral 24. The command signal on lead 26 at the input to the summing amplifier 12 is applied to a reference signal shaping network 28 which acts to convert the control system command signal into a reference signal whose relation to the control system error signal is well defined so that it can be meaningfully compared with the error signal. The reference signal from shaping network 28 is applied to a comparator group 29 along with a fixed bias signal from bias signal supply, 30 and the error signal on lead 32 at the output of summing amplifier 12. The comparator group includes four separate comparators, A, B, C and D, each of which has applied thereto the fixed bias signal, the reference signal from shaping network 28 and the error signal on lead 32. Each of the comparators A, B, C and D is essentially a high gain amplifier whose output polarity is a reflection of the algebraic sign of the weighted sum of its three input signals. The gains applied to the separate comparator inputs of each comparator are chosen to define switching functions, hereinafter described, which discriminate between normal and faulty system operation. As will hereinafter be explained, the system is such that when the polarity of the output signal from any one of the comparators A, B, C or D changes, indicating an off-normal condition, that output signal actuates an indicating device 34 to indicate the off-normal condition. Additionally, the output signals from the comparators can be utilized to automatically disconnect or disable the servo system for the control surface 16 or can be used to actuate an automatic landing procedure in auto-land system 36.

In applying the control system monitor of the invention to a specific control system, it is necessary to select a reference signal shaping network 28 which yields a reference signal with a relatively well defined relation to the control system error signal as explained above. Secondly, it is necessary to obtain by test or simulation, trajectories of the error signal versus the reference signal for the full range of system operating conditions. From this, the largest area occupied by the reference signal versus error signal trajectories can be determined for all normal system operating conditions. Finally, it is necessary to select the comparator input signal gains to define fault discrimination lines on the error signal versus reference signal plot which circumscribe the area occupied by all normal trajectories, such that when the trajectory of error signal versus reference signal exceeds the circumscribed area, the output of one of the comparators A-D will change in polarity to indicate the off-normal condition and/or initiate corrective action.

The foregoing procedure will now be described for the case of a roll control system for a hydrofoil craft. As was mentioned above, the choice of the shaping network 28 depends on the nature of control system error signal. In this example, the roll control system has a significant amount of integration in the forward path and the error signal responds with some delay to changes in the command signal. Therefore, in the case of a hydrofoil craft, a useful reference signal is conveniently generated by selecting as a reference signal shaping network a limited integrator. The resulting reference signal applied to the comparator group 29 is an approximate (i.e., delayed) analog of the control system command.

Figure 2:
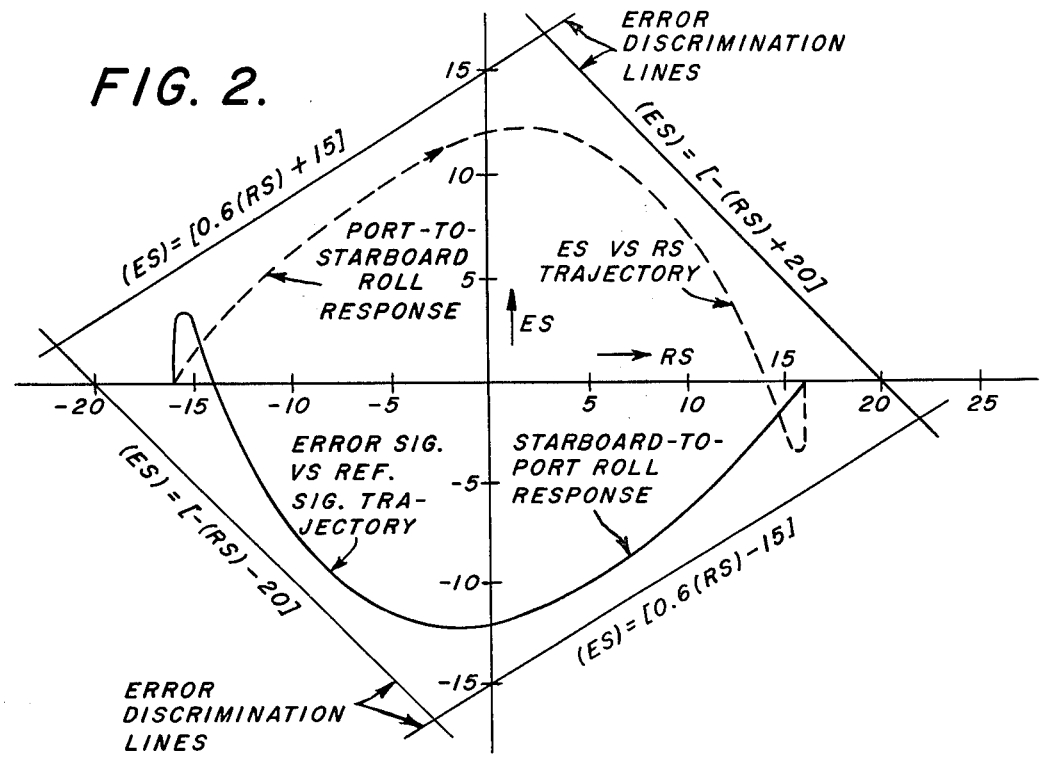
FIG. 2 is a plot of error signal versus reference signal trajectories showing the error discrimination lines provided for by the comparators shown in FIG. 1.

Trajectories of error signal versus reference signal are shown in FIG. 2 for the case of a roll control system for a hydrofoil craft. The solid curve in the lower portion of FIG. 2 represents the response of the error channel to a full scale change in roll angle command from +16° to −16°, where the error signal is plotted not against time but against the reference signal. The upper broken curve shows the corresponding response in the opposite sense. That is, the lower solid curve represents the starboard-to-port roll response; while the upper broken curve represents the port-to-starboard roll response. These two curves enclose the maximum area occupied by trajectories corresponding to fault-free operation, in calm water. Fault discrimination lines can then be drawn which enclose the normal trajectories.

Beginning in the lower right quadrant, for example, a line is positioned near the maximum normal trajectories, leaving a margin of error to account for uncertainties in measurements or performance prediction. The equation for this line in the plane of the graph of FIG. 2 is:

(1) $(ES) = [0.6 \ (RS) - 15]$.

The equation implementing this error discrimination line in comparator D, for example, defines the algebraic sign of the comparator output as follows:

(2) sign $(CP1)$ = sign $[G1(ES) + G2(RS) + G3(B)]$ where:
CP1 is the output signal from comparator D,
G1 is the gain applied to the error signal input to comparator D,
G2 is the gain applied to the reference signal input to the comparator D,
G3 is the gain applied to the bias input signal to the comparator D,
ES is the error signal amplitude,
RS is the reference signal amplitude, and
B is the amplitude of the bias signal.

The equation of the error discrimination line can then be rewritten in terms of comparator gains as follows:

(3) $(ES) = \frac{-1}{G1} [G2 \ (RS) + G3 \ (B)]$.

The magnitude of the bias signal B and comparator gain G1 may be selected at any convenient value and the remaining two comparator gains are determined by comparison of Equations (1) and (3) above. This implementation will produce a comparator output signal CP1 which will change sign when the monitored trajectory crosses the fault discrimination line of Equation (1). The remaining three lines are implemented in a similar manner; and the equations defining those lines are shown in FIG. 2. In this manner, it can be seen that the region of normal trajectories is completely enclosed. It should be noted that the number of line segments can be increased to improve the "fit" around an irregular trajectory area; however each additional line segment will require an additional comparator device.

Figure 3:
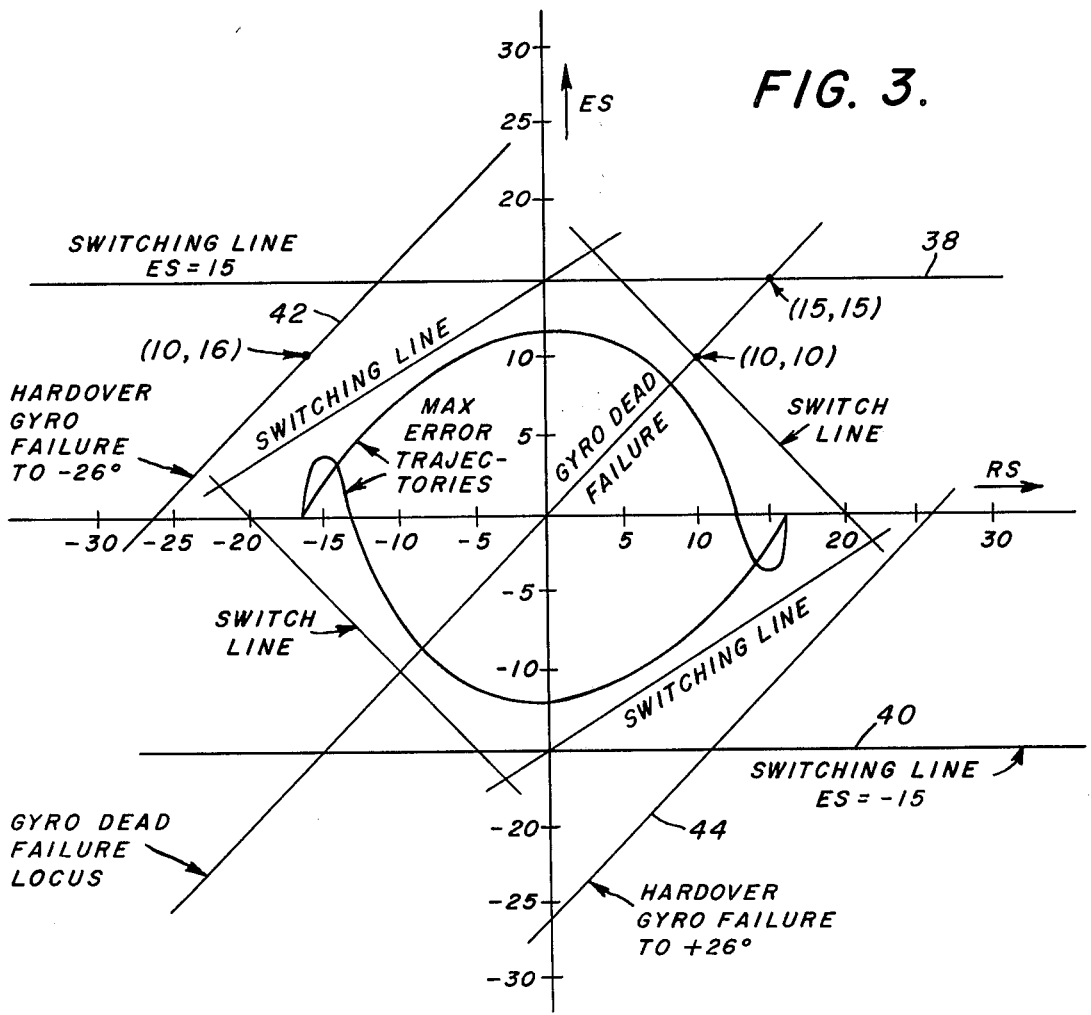
FIG. 3 is a plot of error signal versus reference signal trajectories showing a comparison of the system of the present invention with prior art hard-over failure detectors.

A comparison of the control system monitor of the present invention with a hard-over failure detector of the type described in the introductory part of this specification is given in FIG. 3. In the roll control system example given, the absolute magnitude of roll error during fault-free operation is assumed not to exceed 12°. Leaving a margin for measurement uncertainties, 15° of error is selected as the criterion for failure identification by the hard-over detector. The corresponding +15° and −15° switching lines of the two comparators in a hard-over detector are identified by the reference numerals 38 and 40 in FIG. 3. The locus of maximum error corresponding to a hard-over gyro failure to −26° and +26° is shown by the lines 42 and 44 in FIG. 3. Note that for level flight in which the command signal and reference signal are both zero, the two error detectors work equally well. However, at a commanded bank angle of −16°, for example, the 10° error value on the gyro failure line (point 10, −16) does not lie within the error detection range of a hard-over detector. Similarly, for gyro dead failures, the system of the present invention will detect a dead failure as soon as the reference signal, which follows the command signal, reaches 10° (point 10, 10 of FIG. 3). Yet, this same failure would remain undetected by a hard-over failure detector until the command signal increased to 15° (point 15, 15 of FIG. 3).

Figure 4:
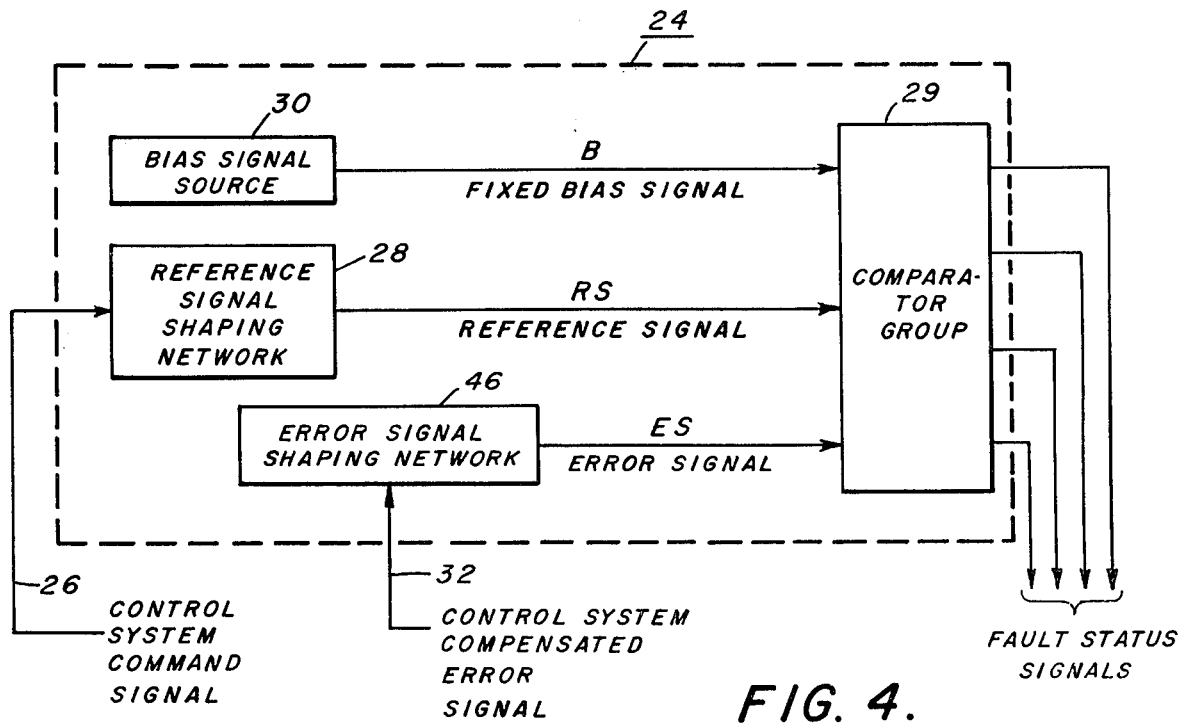
FIG. 4 is a block diagram of an alternative embodiment of the invention employing an error signal shaping network.

FIG. 4 shows an alternative configuration of the invention wherein elements corresponding to those of FIG. 1 are identified by like reference numerals. In this embodiment, however, an error signal shaping network 46 has been added. Control systems with considerable differentiation in the forward path, or high gain control loops subject to frequent large inputs, may operate with the error channel saturated a significant portion of the time. In such cases, error signal amplitude alone cannot serve as a criterion for fault discrimination; but error amplitude plus time delay (or error plus integral of error) may provide a meaningful signal to monitor. This can be accomplished by selecting as the error signal shaping network 46 a limited integrator in the configuration of FIG. 4.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a control system of the type in which a command signal and a feedback signal are converted into an error signal for controlling a servo actuator, the combination of means for converting said command signal into an error signal, means for converting said command signal into a reference signal, at least three high gain amplifier comparator devices each of which is responsive to said reference and error signals, the comparator devices being adapted to produce an output indicative of an off-normal condition when the trajectory of a plot of the error signal versus the reference signal exceeds a predetermined value about a zero error reference point, and means responsive to said output for indicating an off-normal condition.

2. The combination of claim 1 wherein both said reference and error signals vary above and below a zero voltage point, whereby said trajectory of the error signal versus reference signal can traverse four quadrants about said zero voltage point.

3. The combination of claim 2 wherein there are four comparator devices, each of which will produce an output indicating an off-normal condition when the error versus reference trajectory exceeds a predetermined value in one of said quadrants.

4. The combination of claim 1 including a source of bias voltage and wherein said error signal, the reference signal and said bias voltage are applied to each of said comparators, the output polarity of each comparator being a reflection of the algebraic sign of the weighted sum of the three signals applied thereto.

5. The combination of claim 4 wherein an output is derived from one of said comparator devices when the trajectory of error versus reference signal traverses an error discrimination line in one of four quadrants of a plot of error signal versus reference signal, each discrimination line being at an angle with respect to the X-Y axes of the plot to completely enclose said trajectory for all permissible operating conditions.

6. The combination of claim 5 wherein each of said discrimination lines is defined by the general equation:

$ES = [\pm \ G \ (RS) \pm B]$ where ES is the error signal amplitude, RS is the reference signal amplitude and G and B are arbitrary values determining the slope and position of the discrimination line.

7. The combination of claim 1 wherein the servo system is utilized to control the control surfaces of a hydrofoil craft.

8. The combination of claim 1 wherein said command signal is applied to a reference signal sloping network, the output of said sloping network being said reference signal.

* * * * *